(12) United States Patent
Paget et al.

(10) Patent No.: US 9,333,472 B2
(45) Date of Patent: May 10, 2016

(54) PRECISION WARMING BOWL

(71) Applicant: Whirlpool Corporation, Benton Harbor, MI (US)

(72) Inventors: Paul S. Paget, Benton Harbor, MI (US); Mitchell L. Robertson, Elkhart, IN (US)

(73) Assignee: Whirlpool Corporation, Benton Harbor, MI (US)

( * ) Notice: Subject to any disclaimer, the term of this patent is extended or adjusted under 35 U.S.C. 154(b) by 476 days.

(21) Appl. No.: 13/781,901

(22) Filed: Mar. 1, 2013

(65) Prior Publication Data

US 2014/0246420 A1 Sep. 4, 2014

(51) Int. Cl.
| | |
|---|---|
| *B01F 15/06* | (2006.01) |
| *A47J 36/24* | (2006.01) |
| *A47J 43/044* | (2006.01) |
| *A47J 43/07* | (2006.01) |
| *A47J 27/00* | (2006.01) |

(52) U.S. Cl.
CPC ............. *B01F 15/065* (2013.01); *A47J 27/004* (2013.01); *A47J 36/2483* (2013.01); *A47J 43/044* (2013.01); *A47J 43/0727* (2013.01)

(58) Field of Classification Search
None
See application file for complete search history.

(56) References Cited

U.S. PATENT DOCUMENTS

| | | | | |
|---|---|---|---|---|
| 1,468,615 | A * | 9/1923 | Guttenstein et al. | 126/345 |
| 2,187,888 | A * | 1/1940 | Nachumsohn | 219/417 |
| 2,818,794 | A | 1/1958 | Aslesen | |
| 2,872,562 | A * | 2/1959 | McNamara | 219/442 |
| 3,038,058 | A | 6/1962 | Gordon, Jr. | |
| 4,024,377 | A * | 5/1977 | Henke | 219/439 |
| 4,063,068 | A | 12/1977 | Johnson et al. | |
| 4,094,446 | A * | 6/1978 | Brutsman | 222/146.5 |
| 4,249,069 | A * | 2/1981 | Andersen | 219/535 |
| 6,867,394 | B2 * | 3/2005 | Li | 219/433 |
| 6,884,971 | B2 * | 4/2005 | Li | 219/436 |
| 7,012,221 | B2 * | 3/2006 | Li | 219/433 |
| 7,015,423 | B2 * | 3/2006 | Friedman | 219/385 |
| 8,813,635 | B2 * | 8/2014 | Dragan | 99/349 |
| 2003/0116556 | A1 * | 6/2003 | Li | 219/433 |

(Continued)

FOREIGN PATENT DOCUMENTS

| | | |
|---|---|---|
| CH | 674794 A5 * | 7/1990 |
| EP | 0248490 A2 | 3/1987 |

(Continued)

OTHER PUBLICATIONS

European Patent Application No. 14156947.5 filed Feb. 27, 2014, Applicant: Whirlpool Europe Srl, European Search re: same, mail date: Jul. 8, 2014.

*Primary Examiner* — Joseph M Pelham

(57) ABSTRACT

A warming container 10 includes a mixing bowl and a heating cradle configured to receive the mixing bowl. The warming container 10 also includes a shell having an inner facing surface and which is coupled to a bottom edge of the heating cradle at a seat. The seat is configured to receive a base of the mixing bowl. A cavity is defined between the heating cradle and the shell and a conductive heating structure is disposed within the cavity. The conductive heating structure includes a plurality of conductive longitudinal flanges. A wire heating element is disposed about the plurality of conductive longitudinal flanges, wherein the wire heating element is disposed about the conductive heating structure in a sinusoidal configuration. The wire heating element is in thermal communication with the heating cradle via the conductive longitudinal flanges.

19 Claims, 7 Drawing Sheets

(56) References Cited

U.S. PATENT DOCUMENTS

2006/0044935 A1* 3/2006 Benelli et al. ................ 366/145
2009/0194522 A1 8/2009 Connolly
2012/0104214 A1* 5/2012 St. Jacques ............... 248/346.5

FOREIGN PATENT DOCUMENTS

EP 1772086 A1 4/2007
SU 1521453 A1 * 11/1989

* cited by examiner

PRECISION WARMING BOWL

BACKGROUND

The present application generally relates to mixing bowls, and more specifically, to a mixing bowl with a precision heating feature.

SUMMARY

In one aspect, a warming container includes a mixing bowl and a heating cradle configured to receive the mixing bowl. The warming container also includes a shell having an inner-facing surface and which is coupled to a lower edge of the heating cradle at a seat. The seat is configured to receive a base of the mixing bowl. A cavity is defined between the heating cradle and the shell and a conductive heating structure is disposed within the cavity. The conductive heating structure includes a plurality of conductive longitudinal flanges. A wire heating element is disposed about the plurality of conductive longitudinal flanges, wherein the wire heating element is disposed about the conductive heating structure in a sinusoidal configuration. The wire heating element is in thermal communication with the heating cradle via the conductive longitudinal flanges.

In another aspect, the warming container for a mixing bowl includes a heating cradle having a bottom edge and an outer surface. A conductive heating structure is disposed proximate the outer surface of the heating cradle and a heating element is coupled with the conductive heating structure, wherein the heating element is in thermal communication with the heating cradle. The warming container also includes a shell having an inner-facing surface and is coupled to the lower edge of the heating cradle. A cavity is defined between the outer surface of the heating cradle and the inner-facing surface of the shell, wherein the conductive heating structures and the heating element are disposed within the cavity.

In yet another aspect, the warming container includes a mixing bowl and a heating cradle configured to receive the mixing bowl. A plurality of conductive longitudinal flanges is disposed about the heating cradle and a wire heating element is disposed about the plurality of conductive longitudinal flanges. The wire heating element is disposed about the plurality of conductive longitudinal flanges in a sinusoidal configuration, wherein the wire heating element is in thermal communication with the heating cradle via the plurality of conductive longitudinal flanges. The warming container also includes a shell coupled to a lower edge of the heating cradle at a seat. The seat is configured to receive a base of the mixing bowl, wherein the heating cradle is in selective thermal communication with the mixing bowl. A rim member is coupled to a top edge of the heating cradle and a top edge of the shell, and a cavity is defined between the rim member, the shell and the heating cradle, wherein the plurality of arcuate flanges and the wire heating element are disposed within the cavity.

These and other features, advantages, and objects will be further understood and appreciated by those skilled in the art upon studying the following specification, claims, and appended drawings.

DETAILED DESCRIPTION OF EMBODIMENTS

Figure 1:
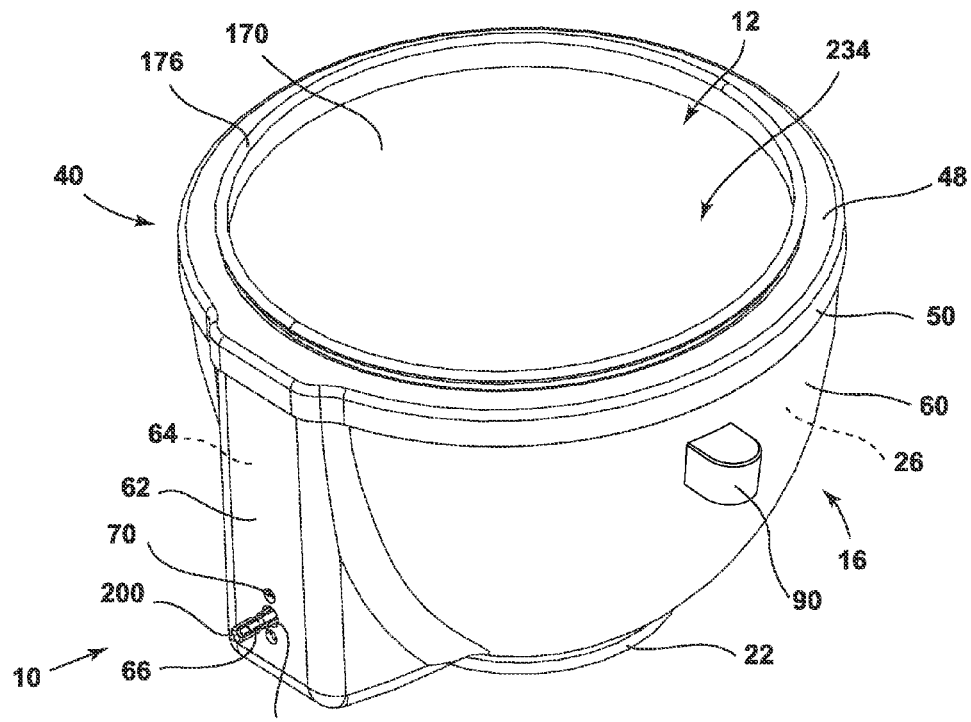
FIG. 1 is a top perspective view of one embodiment of the warming container.

For purposes of description herein the terms "upper," "lower," "right," "left," "rear," "front," "vertical," "horizontal," and derivatives thereof shall relate to the application as oriented in FIG. 1. However, it is to be understood that the application may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
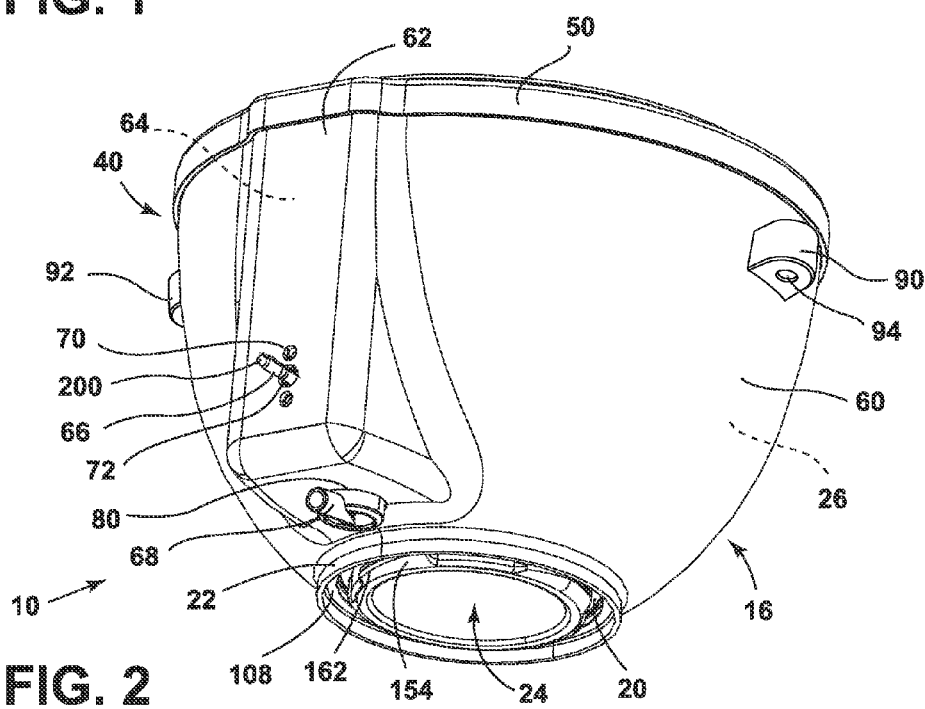
FIG. 2 is a bottom perspective view of the warming container of FIG. 1.
Figure 3:
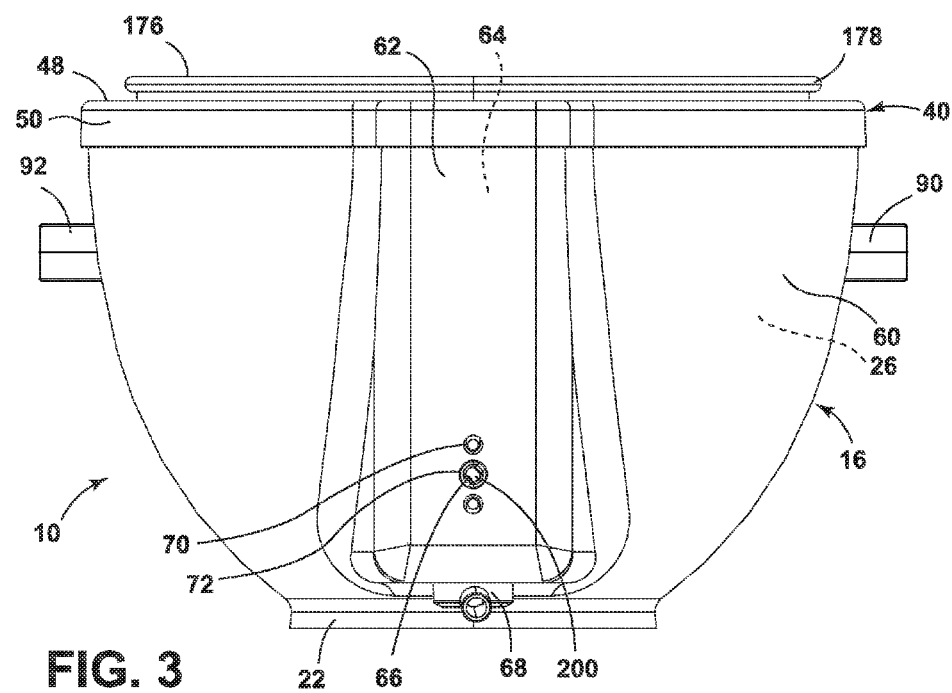
FIG. 3 is a first side elevational view of the warming container of FIG. 1.
Figure 4:
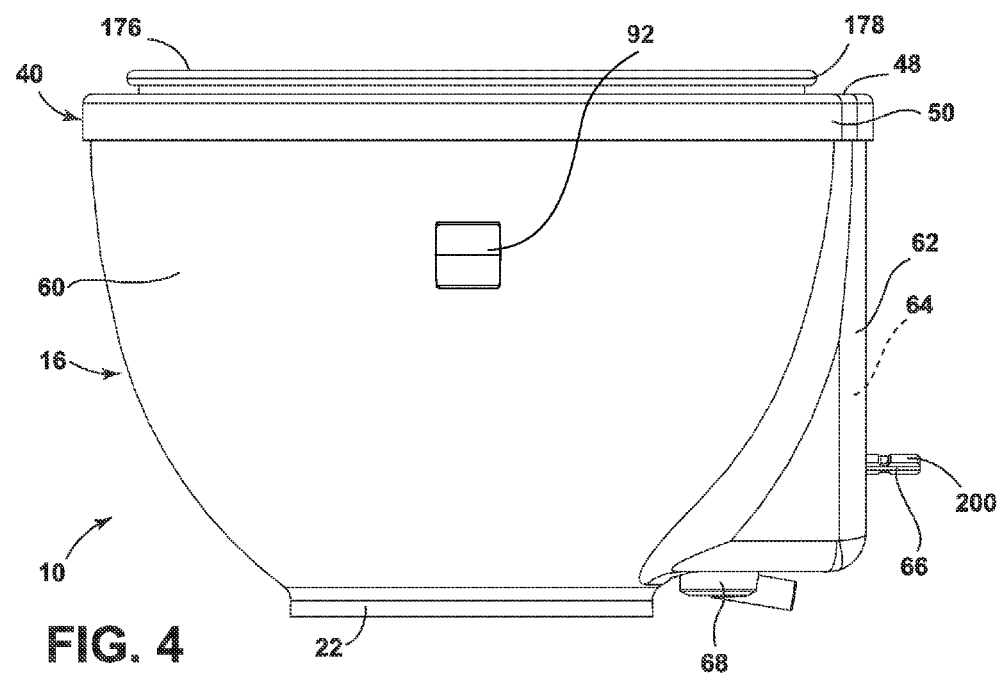
FIG. 4 is a second side elevational view of the warming container of FIG. 1.
Figure 10:
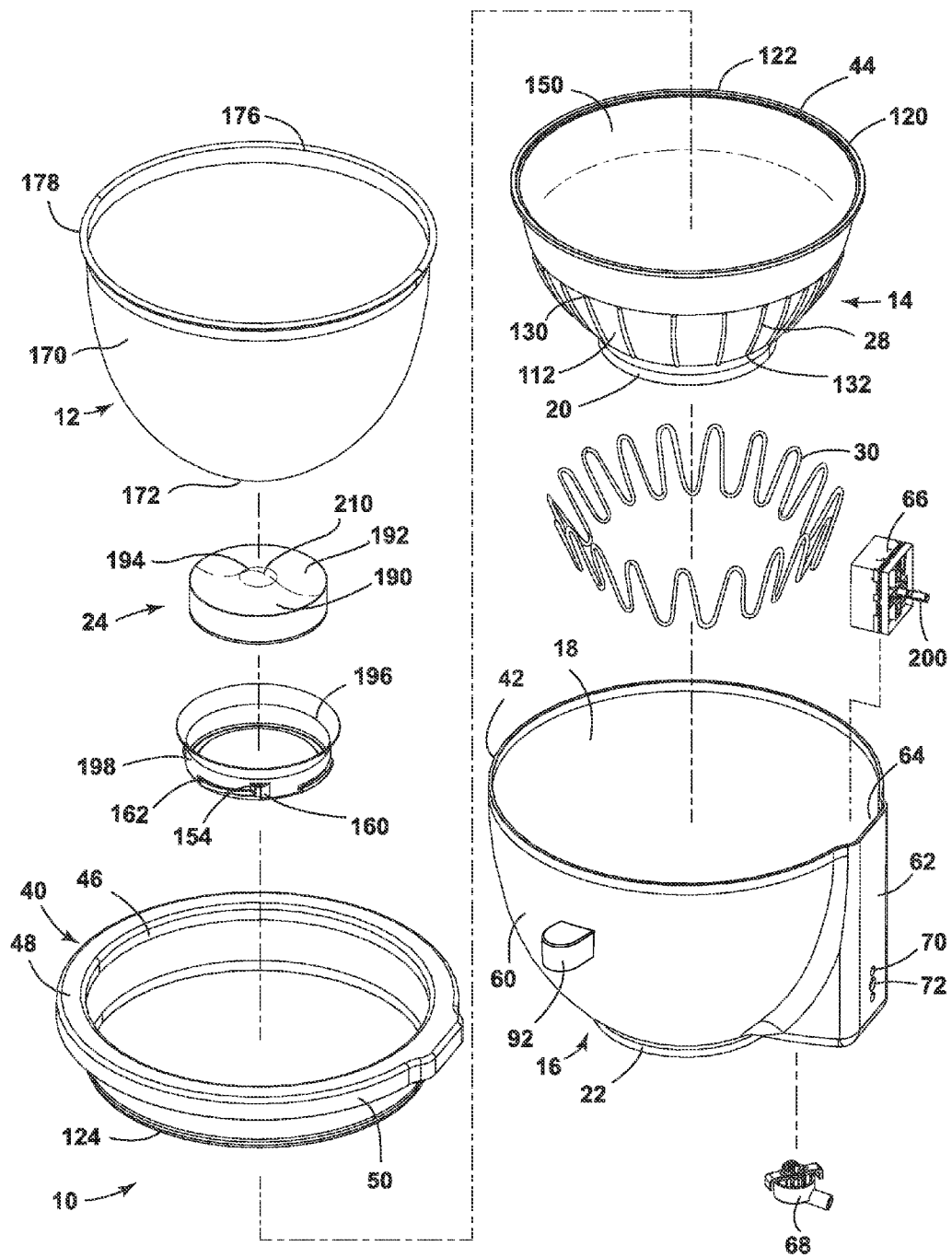
FIG. 10 is an exploded top perspective view of the embodiment of FIG. 1.
Figure 11:
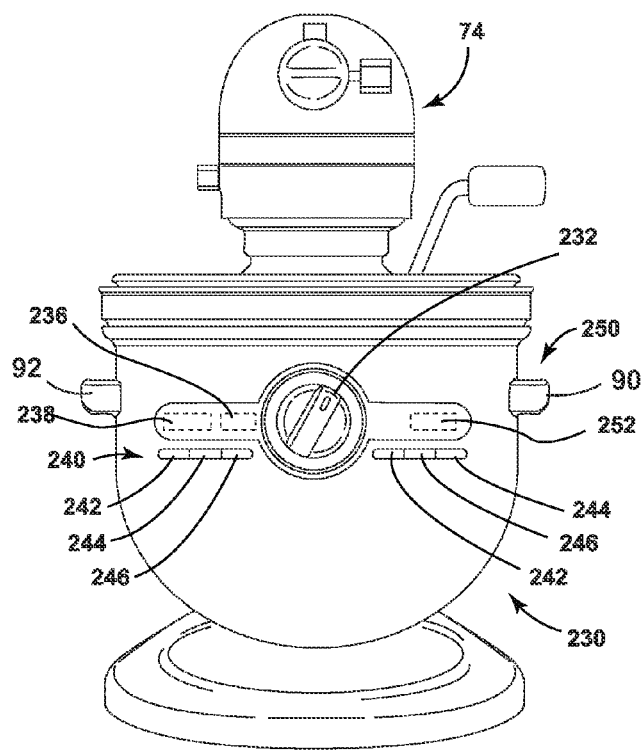
FIG. 11 is a front elevational view of another embodiment of the warming container and user interface.
Figure 12:
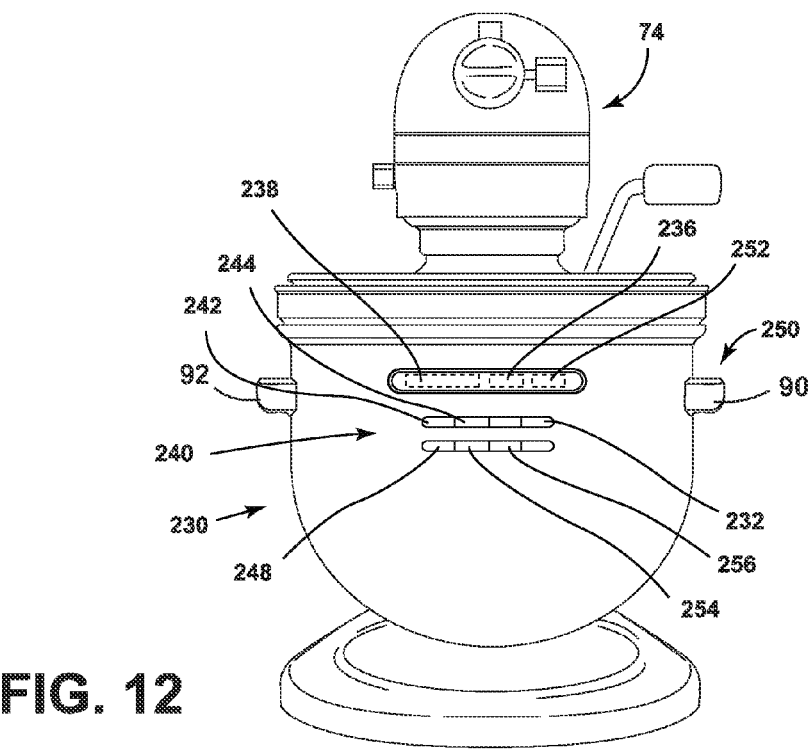
FIG. 12 is a front elevational view of a different embodiment of the warming container and user interface.
Figure 13:
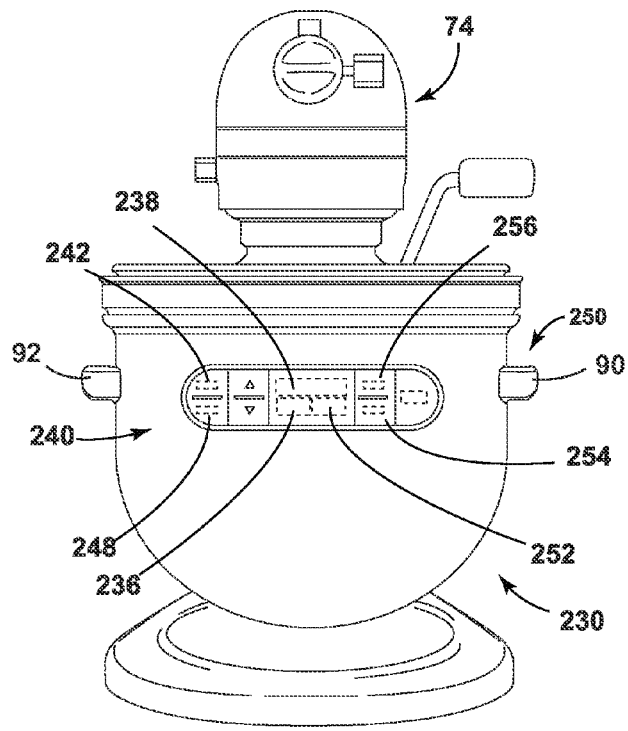
FIG. 13 is a front elevational view of a different embodiment of the warming container and user interface.
Figure 14:
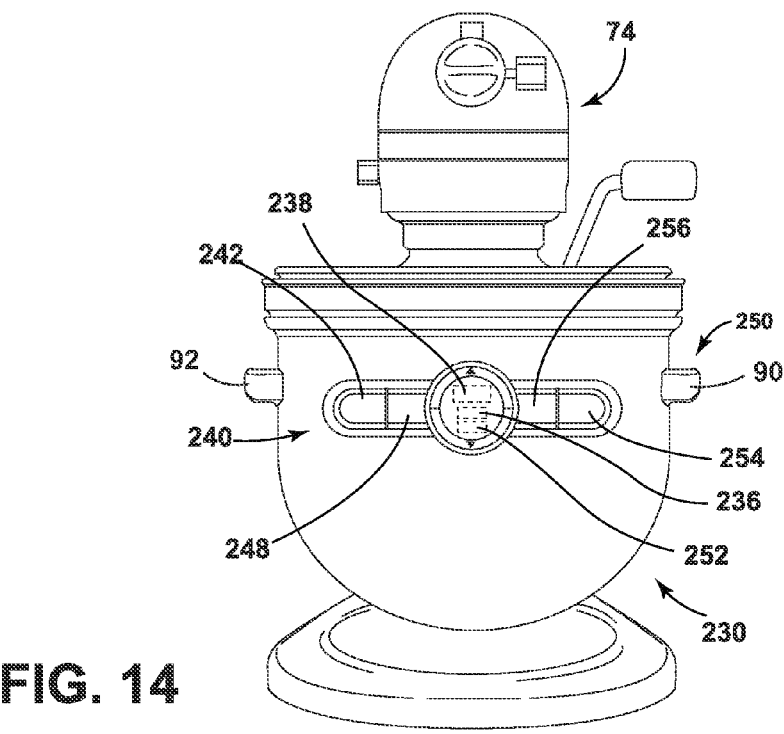
FIG. 14 is a front elevational view of a different embodiment of the warming container and user interface.

As illustrated in FIGS. 1, 2 and 10, the reference numeral 10 generally refers to a warming container 10 that includes a mixing bowl 12 and a heating cradle 14 configured to receive the mixing bowl 12. A shell 16 having an inner-facing surface 18 is coupled to a lower edge 20 of the heating cradle 14 at a seat 22. The seat 22 is configured to receive a base 24 of the mixing bowl 12. A cavity 26 is defined between the heating cradle 14 and the shell 16 and a conductive heating structure is disposed within the cavity 26. The conductive heating structure includes a plurality of conductive longitudinal flanges 28. A wire heating element 30 is disposed in a sinusoidal configuration about the plurality of conductive longitudinal flanges 28 such that the wire heating element 30 is in thermal communication with the heating cradle 14 via the plurality of conductive longitudinal flanges 28.

As illustrated in the embodiment of FIGS. 1-4, 6-7, and 9, a rim member 40 is coupled with a top edge 42 of the shell 16 and an upper edge 44 of the heating cradle 14 to further define the cavity 26 between the shell 16, the heating cradle 14 and the rim member 40. The rim member 40 includes an inner wall 46 disposed proximate the upper edge 44 of the heating cradle 14, an outer wall 48 disposed proximate the top edge 42 of the shell 16, and a top wall 50 that extends between the inner wall 46 and the outer wall 48.

As further illustrated in the embodiment of FIGS. 1-4, 7 and 10, the shell 16 includes an external surface 60 having a substantially hemispheric configuration, and including a service channel 62 that defines an expanded cavity portion 64 for housing electrical and mechanical aspects, that can include, but are not limited to, a control 66 and an electrical receptacle 68 for operating the various functions of the warming container 10. A plurality of orienting receptacles 70 and a switch opening 72 are defined within the service channel 62. As will be more fully described below, in alternate embodiments, the plurality of orienting receptacles 70 and the switch opening 72 can provide an external access point for the warming container 10 to be placed in operable communication with an appliance 74 (shown in FIGS. 11-14), or for a user to manipulate the control 66 to operate the various functions of the warming container 10.

Figure 5:
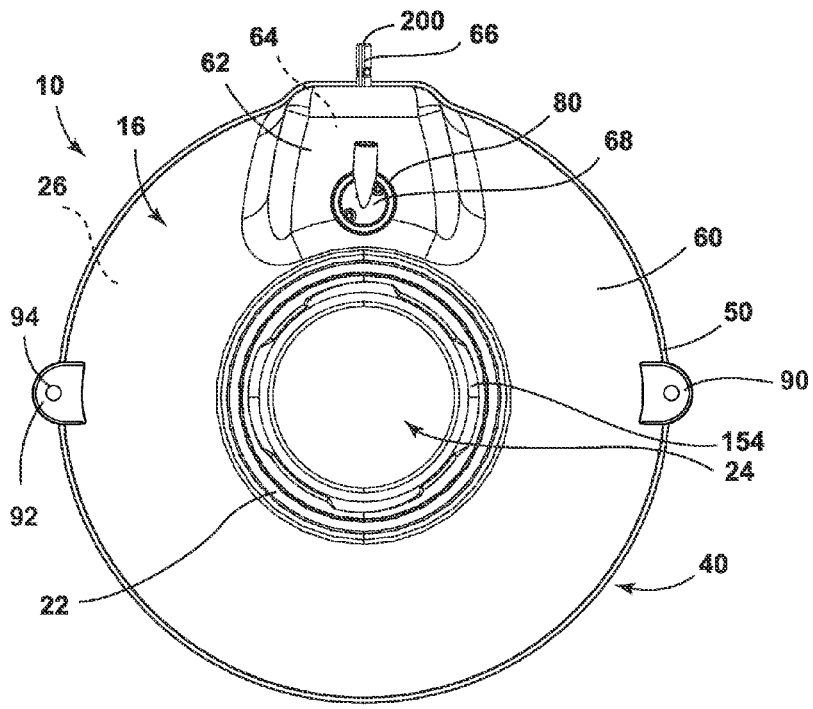
FIG. 5 is a bottom plan view of the warming container of the FIG. 1.
Figure 6:
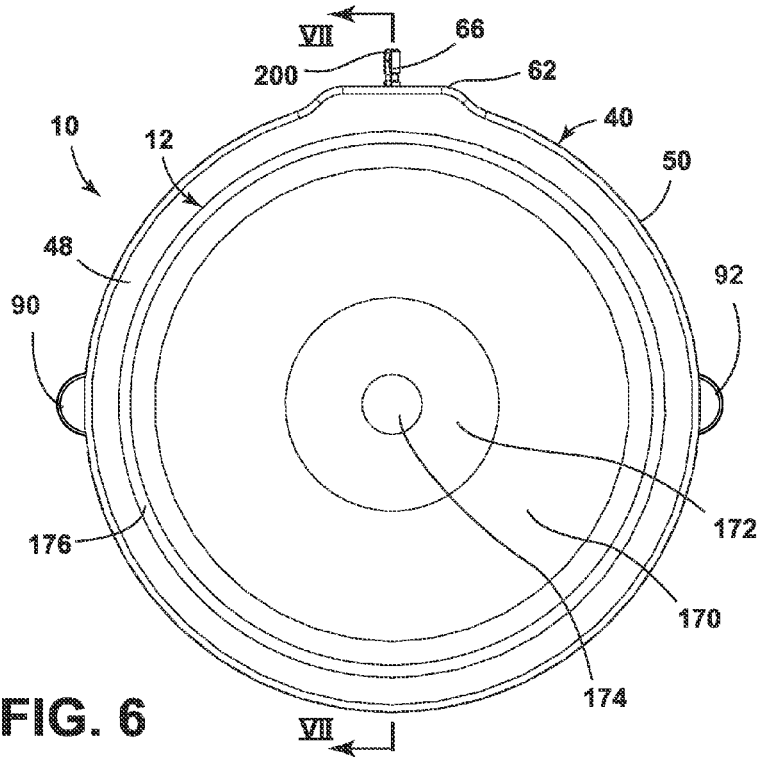
FIG. 6 is a top plan view of the warming container of FIG. 1.
Figure 7:
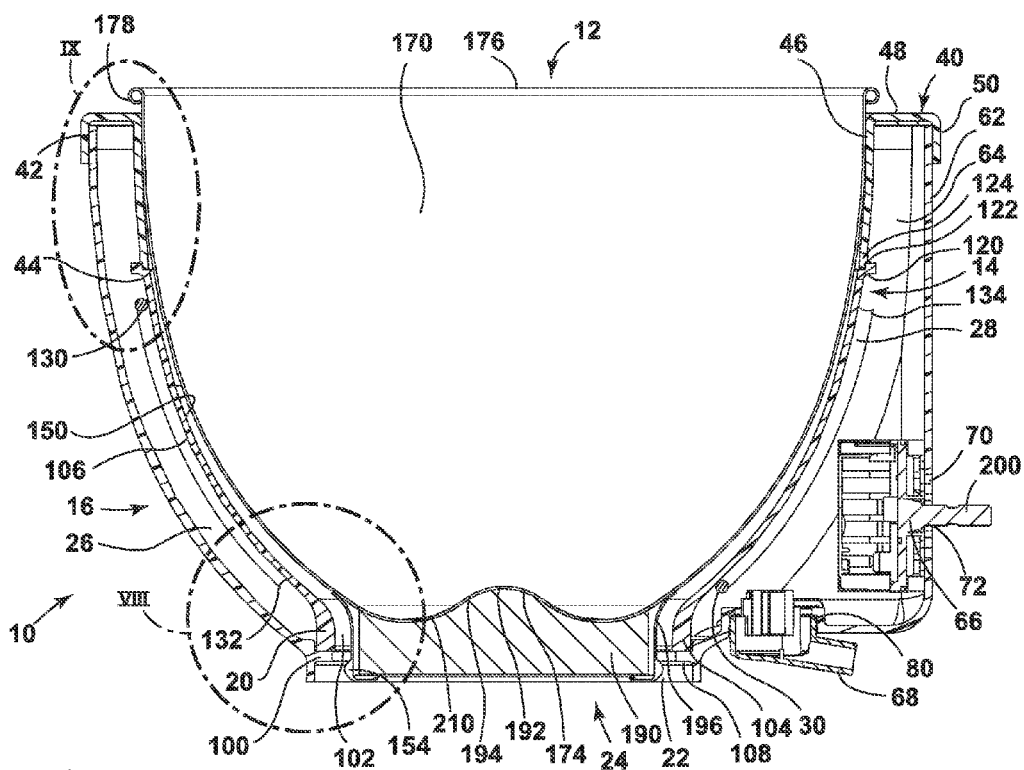
FIG. 7 is a cross-sectional view of the embodiment of FIG. 6 taken at line VII-VII.

As shown in the embodiment of FIGS. 2, 5 and 7, the service channel 62 is configured to receive the electrical receptacle 68, which is disposed proximate the seat 22. A receptacle opening 80 defined by the service channel 62 is configured to receive the electrical receptacle 68. The electrical receptacle 68 is configured to receive and be in communication with an electrical connector of the appliance 74 such that the warming container 10 can be placed in electrical communication with and receive electrical power from the appliance 74. In alternate embodiments, the electrical receptacle 68 can be configured to receive an electrical connection from a different external power source, which can include, but is not limited to, a household or commercial grade electrical outlet.

In alternate embodiments, the electrical receptacle 68 can rotate within the receptacle opening 80 to account for movements of the warming container 10. In this manner, the warming container 10 can be shifted or otherwise moved small distances relative to the appliance 74 without disconnecting the electrical receptacle 68 from the electrical connector.

Referring again to the embodiment illustrated in FIGS. 1 and 2, first and second support members 90, 92 are disposed on the external surface 60 of the shell 16. The first and second support members 90, 92 are configured to be spaced approximately 180° apart. Each of the first and second support members 90, 92 includes a support receptacle 94 on an underside of each of the first and second support members 90, 92. Each support receptacle 94 is configured to engage a portion of the appliance 74 whereby the appliance 74 can support the warming container 10 in a fixed position proximate the appliance 74. The first and second support members 90, 92 can be separate pieces that are attached directly to the external surface 60 of the shell 16. Alternatively, the first and second support members 90, 92 can include portions that are formed as part of the shell 16, where the support receptacles 94 are disposed within the first and second support members 90, 92. In other alternate embodiments, the shell 16 can include a handle disposed on the exterior surface 60 of the shell 16.

As illustrated in the embodiment of FIGS. 1-5 and 7, the shell 16 of the warming container 10 can be made of a substantially formable material, including, but not limited to, metals, plastics, ceramics, or other formable material that is substantially sturdy and can support the weight of the warming container 10 and contents placed within the mixing bowl 12 of the warming container 10.

Figure 8:
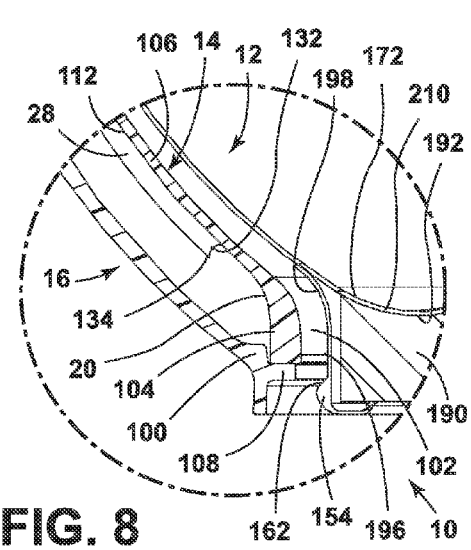
FIG. 8 is an enlarged detail view of the embodiment of FIG. 7 taken at area VIII

Referring now to the embodiment illustrated in FIGS. 7 and 8, the heating cradle 14 is disposed within the shell 16 and the lower edge 20 of the heating cradle 14 is coupled to a bottom edge 100 of the shell 16 to form the seat 22. The seat 22 defines an oculus 102 of the warming container 10 that is configured to receive the base 24 of the mixing bowl 12.

As further shown in the embodiment of FIGS. 7 and 8, the heating cradle 14 includes a flared bottom 104 that extends substantially downward from a concave wall 106 of the heating cradle 14. The flared bottom 104 couples proximate the bottom edge 100 of the shell 16, wherein the bottom edge 100 of the shell 16 includes a plurality of oculus protuberances 108 that are configured to receive the flared bottom 104 of the heating cradle 14. The flared bottom 104 of the heating cradle 14 has a thicker cross-sectional thickness than the concave wall 106 of the heating cradle 14. In this manner, the flared bottom 104 provides a widened base to support the heating cradle 14 on a plurality of oculus protuberances 108.

Figure 9:
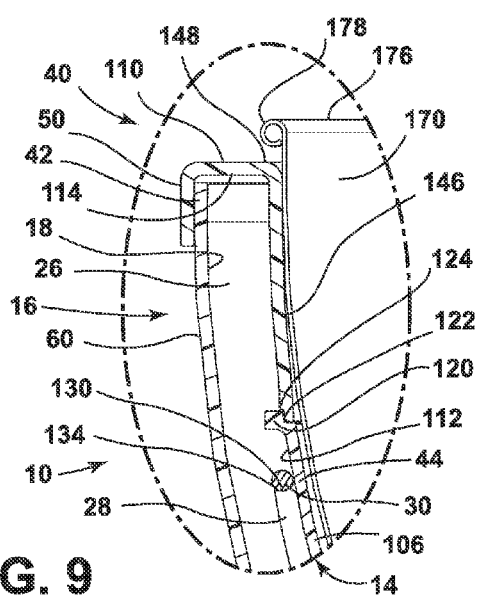
FIG. 9 is a different enlarged detail view of the embodiment of FIG. 7 taken at area IX.

Referring a to the embodiment illustrated in FIGS. 7 and 9, the upper edge 44 of the heating cradle 14 is disposed proximate the top edge 42 of the shell 16, wherein the rim member 40 is coupled to the upper edge 44 of the heating cradle 14 and the top edge 42 of the shell 16 to define an upper surface 110 of the warming container 10. In this manner, the cavity 26 is defined between the inner-facing surface 18 of the shell 16, an outer surface 112 of the heating cradle 14, and an inward surface 114 of the rim member 40.

Referring again to FIG. 9, in the illustrated embodiment, the upper edge 44 of the heating cradle 14 includes an upper flange 120 that extends from the concave wall 106 of the heating cradle 14 and defines an annular notch 122 that is configured to receive an annular edge 124 of the inner wall 46 of the rim member 40. The annular edge 124 of the rim member 40 is configured to engage at least a portion of the upper flange 120 of the heating cradle 14. The inner wall 46 of the rim member 40 extends substantially upward from the annular edge 124 to the top wall 50, wherein the top wall 50 extends orthogonally and outward from the inner wall 46 to the outer wall 48 of the rim member 40. The outer wall 48 extends orthogonally and downward from the top wall 50 and is configured to engage at least a portion of the external surface 60 of the shell 16. In alternate embodiments, the rim member 40 can include an integrated pour spout that can work in cooperation with a pour spout of the mixing bowl 12.

Referring again to the embodiment of FIGS. 6-10, the rim member 40 can be made of substantially formable materials that are at least partially heat conductive. Such materials can include, but are not limited to, metals, glass, ceramics, plastics, and other at least partially heat conductive materials. In alternate embodiments, the rim member 40 can be made of substantially heat resistant materials.

Referring now to FIGS. 7-10, in the illustrated embodiment, the plurality of conductive longitudinal flanges 28 are disposed within the cavity 26 and proximate the outer surface 112 of the heating cradle 14. The plurality of conductive longitudinal flanges 28 can have an arcuate shape that follows the curvature of the concave wall 106 of the heating cradle 14, and can be disposed about the outer surface 112 of the heating cradle 14. Each of the plurality of conductive longitudinal flanges 28 includes a first end 130 that is distal from the upper flange 120. Each of the plurality of longitudinal flanges 26 extends along the outer surface 112 of the heating cradle 14 and downward to a second end 132 that is disposed distal from the flared bottom 104 of the heating cradle 14. The plurality of conductive longitudinal flanges 28 are configured to be in thermal communication with the heating cradle 14.

As illustrated in the embodiment of FIGS. 7-9, the first and second ends 130, 132 of the plurality of conductive longitudinal flanges 28 each define a spur 134 that is configured to receive at least a portion of the wire heating element 30. In this manner, the wire heating element 30 can be wound about the plurality of conductive heating flanges 28 in an undulating pattern and held in place by each of the plurality of longitudinal flanges 28 by at least one spur 134 disposed on the first and second ends 130, 132 of each of the plurality of conductive longitudinal flanges 28.

In alternate embodiments, the conductive heating structure can include a plurality of arcuate flanges that are disposed longitudinally about the outer surface 112 of the heating cradle 14. In other embodiments, the plurality of arcuate flanges can be configured to have a "T" cross-section or "L" cross-section that includes an outer flange. In this embodiment, the outer flange can define the spur 134 around which the wire heating element 30 is disposed and secured to the outer surface 112 of the heating cradle 14.

Referring again to the illustrated embodiment as shown in FIGS. 7-10, the heating cradle 14 can be made of a formable and thermally conductive material, such as metal. In such an embodiment, the plurality of conductive longitudinal flanges 28 can also be made of metal and can be formed as part of a heating cradle 14, or, in alternate embodiments, can be attached as separate elements to the outer surface 112 of the heating cradle 14.

In other alternate embodiments, the heating cradle 14 may be made of other thermally conductive and formable materials that include, but are not limited to, glass, ceramics, or another thermally conductive material. In such embodiments, the plurality of conductive longitudinal flanges 28 can also be integrally formed with the heating cradle 14 or can be separate members that are attached to the outer surface 112 of the heating cradle 14.

Referring again to the embodiment illustrated in FIGS. 7-10, the wire heating element 30 is disposed within the cavity 26 about the plurality of conductive longitudinal flanges 28, wherein the wire heating element 30 is disposed about the plurality of conductive longitudinal flanges 28 in a sinusoidal configuration. The wire heating element 30 is configured to be disposed about the heating cradle 14, such that the wire heating element 30 can provide consistent levels of heating throughout the heating cradle 14. In addition, the wire heating element 30 can include a resistance value of from 10-20 K ohms. In alternate embodiments, different resistance values can be used based upon various configurations of the warming container 10, and various electricity levels used during the operation of the warming container 10. In the illustrated embodiment, the resistance of the wire heating element 30 is configured to achieve a wattage output of 16-17 W of power for each lineal foot of the wire heating element 30 or approximately 50 W/m output. In this configuration, the wire heating element 30 can contain approximately 2.6 m of wire, which will draw approximately 120-150 W of power. In addition, based upon a heating efficiency of the warming container 10 of 50-60%, the input power provided to ingredients disposed within the mixing bowl 12 will be approximately 60-90 W of power. As will be more fully described below, the wire heating element 30 can be configured to cooperate with the control 66 and the electrical receptacle 68 to provide stable levels of heating to the heating cradle 14.

In alternate embodiments, the conductive heating structure can include a plurality of lateral flange rings that extend outward from the outer surface 112 of the heating cradle 14. In such an alternate embodiment, the wire heating element 30 would be wound laterally about the outer surface 112 of the heating cradle 14 and coupled to the flange rings to create a spiral pattern of the wire heating element 30 about the outer surface 112 of the heating cradle 14.

In other alternate embodiments, a thermally conductive and adhesive foil membrane can be configured to engage the wire heating element 30 and dispose the wire heating element 30 to the outer surface 112 of the heating cradle 14, such that the foil membrane and the wire heating element 30 are in thermal communication with the heating cradle 14.

Referring again to the illustrated embodiment, as shown in FIGS. 2, 5 and 7, the bottom edge 100 of the shell 16 and the lower edge 20 of the heating cradle 14 include the seat 22 which defines the oculus 102 into which the base 24 of the mixing bowl 12 can be disposed. In this manner, the mixing bowl 12 is placed in selective thermal communication with an inner surface 150 of the heating cradle 14. The plurality of oculus protuberances 108 are disposed on the seat 22 proximate the bottom edge 100 of the shell 16. The plurality of oculus protuberances 108 selectively and matingly cooperate with a plurality of engagement protuberances 154 disposed proximate the base 24 of the mixing bowl 12. The plurality of oculus protuberances 108 and the plurality of engagement protuberances 154 are configured to couple the base 24 of the mixing bowl 12 within the oculus 102 defined by the seat 22 such that the mixing bowl 12 is secured within the warming container 10.

As illustrated in the embodiment shown FIG. 10, the plurality of engagement protuberances 154 can include a substantially vertical portion 160 that is configured to be selectively disposed between the plurality of oculus protuberances 108. In addition, the plurality of engagement protuberances 154 can also include an inclined portion 162 that slidably engages the plurality of oculus protuberances 108 to upwardly bias the mixing bowl 12 and selectively secure the mixing bowl 12 within the warming container 10.

As illustrated in the embodiment of FIGS. 1 and 6-10, the mixing bowl 12 includes a substantially hemispheric sidewall 170 connected to a bottom wall 172, wherein the bottom wall 172 includes a center protuberance 174 that extends from the bottom wall 172. The mixing bowl 12 can also include a flared lip 176 that selectively extends, at least partially, over the rim member 40 of the warming container 10, wherein the flared lip 176 can include a rolled member 178.

As illustrated in the embodiment of FIGS. 7, 8, and 10, the base 24 of the mixing bowl 12 is coupled to the mixing bowl 12 proximate the bottom wall 172 and includes an inner portion 190 having a top surface 192 that includes a secondary protuberance 194. The secondary protuberance 194 is configured to be matingly disposed proximate the center protuberance 174 of the bottom wall 172 of the mixing bowl 12. The base 24 of the mixing bowl 12 also includes a coupling ring 196 that surrounds and couples to the inner portion 190, wherein an outer member 198 of the coupling ring 196 includes the plurality of engagement protrusions 154. The coupling ring 196 is engaged proximate the sidewall 170 and the bottom wall 172 of the mixing bowl 12. The mixing bowl 12 can be made of materials that are substantially thermally conductive, and which include, but are not limited to, metals, glass, ceramics, and other thermally conductive materials.

As illustrated in FIGS. 7, 8, and 10 of the illustrated embodiment, the control 66 is disposed within the expanded cavity portion 64 defined by the service channel 62 of the shell 16. The control 66 includes a switch 200 configured to be disposed through the switch opening 72 defined by the service channel 62, such that an external control can be coupled with the switch 200 and the plurality of orienting receptacles 70 and placed in communication with the switch 200 to permit the external control to selectively regulate the voltage provided to the wire heating element 30 and, in turn, regulate the amount of heating provided to the mixing bowl 12. The control 66 is configured to be in communication with the electrical receptacle 68 and the wire heating element 30, and the electrical receptacle 68 is configured to be in communication with the control 66 and the wire heating element 30.

As shown in the embodiment of FIGS. 7-10, the control 66 includes an open loop infinite control, whereby the infinite control can selectively provide minor increases or decreases in the amount of voltage provided to the wire heating element 30 so as to provide a precise temperature control to regulate the temperature within the mixing bowl 12. In alternate embodiments, a closed loop electronic control can be used to generate customer feedback to provide information which may include, but is not limited to, the temperature of items placed within the mixing bowl 12. In such an embodiment, a thermocouple 210 is disposed proximate the bottom wall 172 of the mixing bowl 12, wherein the thermocouple 210 is configured to be in selective communication with the heating cradle 14. In this manner, the thermocouple 210 can monitor the voltage provided to the wire heating element 30 as well as the temperature of items placed within the mixing bowl 12.

Referring now to the illustrated embodiment as shown in FIGS. 11-14, the control 66 can also include a user interface 230 disposed in the external surface 60 of the shell 16, wherein the user interface 230 can control the various functions of the warming container 10, and also provide various information to the user as to the contents of the mixing bowl 12 and temperature information concerning the warming container 10 and contents disposed therein. The user interface 230 can include a temperature interface 232 that can include, but is not limited to, a dial, a click knob, a rotating ring, or other rotating interface that can be used to select the desired temperature of an interior 234 of the mixing bowl 12 (shown in FIG. 1). Temperature indicia 236 relating to the selected temperature can include, but is not limited to, a color or tactile interface, or a visual interface surrounding the temperature interface 232, or visual indicia contained within a display 238, such as an LCD or digital display 238, disposed on the exterior surface 60 of the shell 16. In alternate embodiments, the temperature interface 232 can also include touch controls, a rocker switch, or other selection method. A plurality of selection interfaces 240 can also be disposed in the user interface 230 that can include, but are not limited to, a power interface 242 for turning on and off the warming container 10, a mode interface 244 for selecting a predetermined heating configuration, an initiating/terminating interface 246 for beginning or ending a preselected and predetermined heating configuration, and a program interface 248 for selecting a predetermined heating program related to the amount or type of food that is disposed within the mixing bowl 12. The display 238 can also include indicia relating to the plurality of selection interfaces 240 described above.

As further illustrated in the embodiment of FIGS. 11-14, the warming container 10 can also include a scale feature 250, wherein the scale feature 250 is disposed proximate the first and second support members 90, 92, and in communication with the mixing bowl 12 and the user interface 230. In this embodiment, as food materials are placed within the mixing bowl 12, the scale feature 250 monitors the additional pressure exerted on the first and second support members 90, 92 to determine the weight of food materials placed within the mixing bowl 12. The display 238 can be configured to provide scale indicia 252 related to the weight of the materials placed within the mixing bowl 12. Additional selection interfaces 240 can be included within the user interface 230, which can include, but are not limited to, a power interface 242 for the scale function 250, a units interface 254 to select the desired weight units to be displayed on the display interface 256, and a reset interface 256 that can be used to calibrate the scale function 250.

In other alternate embodiments, the scale feature 250 can be included in a pour shield that is configured to be selectively disposed proximate the flared lip 176 of the mixing bowl 12. In such an embodiment, the pour shield is in communication with the electrical receptacle 68 and the first and second support members 90, 92. In still other alternate embodiments, the scale feature can be, at least partially disposed in the appliance 74.

In the various embodiments, as illustrated in FIGS. 7-14, all of the electrical functions included within the warming container 10 are in communication with the electrical receptacle 68 disposed within the receptacle opening 80 of the service channel 62 of the shell 16. As discussed above, the electrical receptacle 68 can receive electrical power from the appliance 74 that the warming container 10 is coupled with, or directly from an external source of electricity, such as a household or commercial grade electrical outlet. In additional, data can be transmitted between the warming container 10 and the appliance 74 via the electrical receptacle 68. In such an embodiment, the plurality of orienting receptacles 70 can be configured to be data input receptacles that can be in communication with the control 66.

It will be understood by one having ordinary skill in the art that construction of the described application and other components is not limited to any specific material. Other exemplary embodiments of the application disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the application as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present application. The exemplary structures and processes disclosed herein are for illustrative purposes and are not to be construed as limiting.

It is also to be understood that variations and modifications can be made on the aforementioned structures and methods without departing from the concepts of the present application, and further it is to be understood that such concepts are intended to be covered by the following claims unless these claims by their language expressly state otherwise.

The above description is considered that of the illustrated embodiments only. Modifications of the application will occur to those skilled in the art and to those who make or use the application. Therefore, it is understood that the embodiments shown in the drawings and described above is merely for illustrative purposes and not intended to limit the scope of the application, which is defined by the following claims as interpreted according to the principles of patent law, including the Doctrine of Equivalents.

What is claimed is:

1. A warming container comprising:
a mixing bowl;
a heating cradle configured to receive the mixing bowl;
a shell having an inner surface and coupled to a lower edge of the heating cradle at a seat, wherein the seat is configured to receive a base of the mixing bowl;
a cavity defined between the heating cradle and the shell;
a conductive heating structure disposed within the cavity, the conductive heating structure including a plurality of thermally conductive elongate flanges; and
a wire heating element disposed about the plurality of conductive longitudinal flanges, wherein the wire heating element is disposed about the conductive heating structure in a sinusoidal configuration, and wherein the wire heating element is in thermal communication with the heating cradle via the plurality of conductive longitudinal flanges.

2. The warming container of claim 1, comprising:
a rim member coupled with a top edge of the shell and an upper edge of the heating cradle, wherein the rim member at least partially defines the cavity.

3. The warming container of claim 1, comprising:
a thermocouple disposed on an outer surface of the bowl, wherein the thermocouple is in thermal communication with the heating cradle.

4. The warming container of claim 1, comprising:
a control at least partially disposed within the cavity proximate the shell, wherein the control is in communication with the wire heating element.

5. The warming container of claim 4, comprising:
an electrical receptacle disposed at least partially within the shell, wherein the electrical receptacle is in communication with the control and the wire heating element.

6. The warming container of claim 5, wherein the wire heating element includes a resistance value of between 10 and 20 K ohms.

7. A warming container for a mixing bowl, the warming container comprising:
a heating cradle having a lower edge and an outer surface;
a conductive heating structure disposed proximate the outer surface of the heating cradle, wherein the conductive heating structure comprises a plurality of arcuate flanges disposed about the outer surface of the heating cradle;
a heating element coupled with the conductive heating structure, wherein the heating element is in thermal communication with the heating cradle;
a shell having an inner-facing surface and coupled to the lower edge of the heating cradle; and
a cavity defined between the outer surface of the heating cradle and the inner-facing surface of the shell, wherein the conductive heating structures and the heating element are disposed within the cavity.

8. The warming container of claim 7, wherein the heating element is a wire heating element disposed in an undulating pattern about the conductive heating structure.

9. The warming container of claim 7, comprising:
a thermocouple in thermal communication with an inner facing surface of the heating cradle.

10. The warming container of claim 7, comprising:
a rim member coupled with a top edge of the shell and an upper edge of the heating cradle, wherein the rim member at least partially defines the cavity.

11. The warming container of claim 7, comprising:
a control disposed proximate the shell, wherein the control is in communication with the heating element.

12. The warming container of claim 11, comprising:
an electrical receptacle disposed on the shell, wherein the electrical receptacle is in communication with the control and the heating element.

13. The warming container of claim 12, wherein the heating element includes a wire heating element having a resistance value of between 10 and 20 K ohms.

14. A warming container comprising:
a mixing bowl;
a heating cradle configured to receive the mixing bowl;
a plurality of thermally conductive elongate flanges disposed about the heating cradle;
a wire heating element disposed about the conductive elongate flanges, wherein the wire heating element is disposed about the plurality of conductive elongate flanges in a sinusoidal configuration, and wherein the wire heating element is in thermal communication with the heating cradle via the plurality of conductive elongate flanges;
a shell coupled to a lower edge of the heating cradle at a seat, wherein the seat is configured to receive a base of the mixing bowl, and wherein the heating cradle is in thermal communication with the mixing bowl;
a rim member coupled to an upper edge of the heating cradle and a top edge of the shell; and
a cavity defined between the rim member, the shell and the heating cradle, wherein the plurality of conductive elongate flanges and the wire heating element are disposed within the cavity.

15. The warming container of claim 14, wherein the wire heating element includes a resistance value of between 10 and 20 K ohms.

16. The warming container of claim 14, comprising:
a thermocouple in thermal communication with an inner facing surface of the heating cradle.

17. The warming container of claim 14, comprising:
a control at least partially disposed within the cavity proximate the shell, wherein the control is in communication with wire heating element.

18. The warming container of claim 17, comprising:
an electrical receptacle disposed on the shell, wherein the electrical receptacle is in communication with the control and the wire heating element.

19. The warming container of claim 17, wherein the control includes an infinite switch.

\* \* \* \* \*